United States Patent
Chan et al.

(10) Patent No.: US 9,864,923 B2
(45) Date of Patent: *Jan. 9, 2018

(54) ASSISTED SURVEILLANCE OF VEHICLES-OF-INTEREST

(71) Applicant: Massachusetts Institute of Technology, Cambridge, MA (US)

(72) Inventors: Michael T. Chan, Bedford, MA (US); Jason R. Thornton, Chelmsford, MA (US); Aaron Z. Yahr, Somerville, MA (US); Heather Zwahlen, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,347

(22) Filed: Jun. 20, 2016

(65) Prior Publication Data

US 2016/0321519 A1    Nov. 3, 2016

Related U.S. Application Data

(63) Continuation of application No. 13/800,186, filed on Mar. 13, 2013, now Pat. No. 9,373,033.

(60) Provisional application No. 61/610,454, filed on Mar. 13, 2012.

(51) Int. Cl.
| | |
|---|---|
| *G06K 9/46* | (2006.01) |
| *G06K 9/00* | (2006.01) |
| *G08G 1/015* | (2006.01) |

(52) U.S. Cl.
CPC ....... *G06K 9/4609* (2013.01); *G06K 9/00536* (2013.01); *G06K 9/00771* (2013.01); *G06K 9/00785* (2013.01); *G06K 9/4652* (2013.01); *G06K 2209/23* (2013.01); *G08G 1/015* (2013.01)

(58) Field of Classification Search
CPC combination set(s) only.
See application file for complete search history.

(56) References Cited

U.S. PATENT DOCUMENTS

| | | | |
|---|---|---|---|
| 9,373,033 B2 * | 6/2016 | Chan | ................. G06K 9/00536 |
| 2005/0083212 A1 | 4/2005 | Chew | |
| 2009/0174575 A1 | 7/2009 | Allen et al. | |
| 2010/0070343 A1 | 3/2010 | Taira et al. | |
| 2012/0106800 A1 | 5/2012 | Khan et al. | |
| 2012/0166080 A1 * | 6/2012 | Hung | ................. G08G 1/0175 |
| | | | 701/448 |
| 2013/0030870 A1 | 1/2013 | Swinson et al. | |
| 2013/0088600 A1 | 4/2013 | Wu et al. | |
| 2013/0287248 A1 | 10/2013 | Gao et al. | |

(Continued)

*Primary Examiner* — Hussein Elchanti
(74) *Attorney, Agent, or Firm* — McCarter & English, LLP; David R. Burns

(57) ABSTRACT

A computer-implemented image processing method includes accessing image data representing a plurality of images of a plurality of vehicles and reading a data model representing a predefined vehicle attribute. The method further includes processing a portion of the image data to detect a vehicle feature of at least one of the vehicles represented in at least one of the images based on the predefined vehicle attribute, and processing the portion of the image data to generate vehicle data representing the detected vehicle feature.

18 Claims, 4 Drawing Sheets

(56) References Cited

U.S. PATENT DOCUMENTS

2014/0037142 A1 2/2014 Bhanu et al.
2014/0362230 A1 12/2014 Bulan et al.

* cited by examiner

ASSISTED SURVEILLANCE OF VEHICLES-OF-INTEREST

CROSS-REFERENCE TO RELATED APPLICATIONS

The present application is a continuation of U.S. patent application Ser. No. 13/800,186, filed Mar. 13, 2013, entitled "ASSISTED SURVEILLANCE OF VEHICLES-OF-INTEREST", which claims the benefit of U.S. Provisional Application No. 61/610,454, filed Mar. 13, 2012, and entitled "ASSISTED SURVEILLANCE OF VEHICLES-OF-INTEREST," both applications being incorporated herein by reference in their entirety.

STATEMENT OF GOVERNMENT INTEREST

This invention was made with government support under Grant No. FA8721-05-C-0002 awarded by the U.S. Air Force. The government has certain rights in this invention.

BACKGROUND

Surveillance imagery (such as surveillance video) has many uses including the relay of situational awareness, recording of incidents in real-time, monitoring of high value assets, and providing cues of suspicious behavior. Although surveillance imagery tends to capture high-value information content across a range of locations, it is often very challenging for users to identify, extract and utilize such information on account of the sheer volume of data captured. Indeed, because of limited human resources, manual review of large volumes of surveillance data tends to be a tedious and time-consuming process.

SUMMARY

The present disclosure relates to new and useful systems and methods for implementing automatic image content retrieval, for example, video content retrieval, as related to vehicles. The present disclosure relates to and expands on the teachings of U.S. Application No. 61/559,539, filed Nov. 14, 2011 and entitled "Assisted Video Surveillance of Persons of Interest," which is incorporated herein by reference in its entirety.

According to an embodiment, a computer-implemented image processing method includes accessing image data representing a plurality of images of a plurality of vehicles and reading a data model representing a predefined vehicle attribute. The method further includes processing a portion of the image data to detect a vehicle feature of at least one of the vehicles represented in at least one of the images based on the predefined vehicle attribute, and processing the portion of the image data to generate vehicle data representing the detected vehicle feature.

In some embodiments, the method may include accessing a part-based mixture model calculated from training data representing the predefined vehicle attribute. The vehicle feature may be detected in the portion of the image data using the part-based mixture model. In some embodiments, the part-based mixture model may be learned using a latent support vector machine.

In some embodiments, the method may include processing the image data representing the detected vehicle feature to generate a characterization of the vehicle based at least in part on the part-based mixture model. In some embodiments, the characterization of the vehicle may include a predefined vehicle type and/or at least one predefined vehicle color.

In some embodiments, the method may include receiving a search query from a user, processing the vehicle data to search for a vehicle of interest in the images corresponding to the search query, and displaying, using a graphical user interface operatively coupled to the processor, the vehicle of interest. In some embodiments, the method may include assigning a rank to the vehicle of interest using at least in part the part-based mixture model.

In some embodiments, the method may include using a vehicle detection module to automatically detect at least one of the plurality of vehicles in at least one of the plurality of images. The method may further include using a vehicle feature extraction module to automatically detect the vehicle feature and generate the vehicle data. The method may further include storing the vehicle data in memory. The method may further include using a search module to query the stored vehicle data and return, based on one more vehicle feature search parameters, one or more vehicles of interest.

According to an embodiment, an image processing system includes a processor and a memory operatively coupled to the processor. The memory has stored therein instructions that when executed by the processor cause the processor to access the image data representing a plurality of images of a plurality of vehicles, read at least one predefined vehicle attribute, process a portion of the image data to detect a vehicle feature of at least one of the vehicles represented in at least one of the images based on the predefined vehicle attribute(s), and process the portion of the image data to generate vehicle data representing the detected vehicle feature.

In some embodiments, the memory may have stored therein instructions that when executed by the processor cause the processor to access a part-based mixture model calculated from training data representing the predefined vehicle attribute(s). The vehicle feature may be detected in the portion of the image data using the part-based mixture model. In some embodiments, the part-based mixture model may be learned with a latent support vector machine using training images. The latent variables may be associated with negative and/or positive image examples and may be optimized in the training process.

In some embodiments, the memory may have stored therein instructions that when executed by the processor cause the processor to process the image data representing the detected vehicle feature to generate a characterization of the vehicle based at least in part on the part-based mixture model. In some embodiments, the characterization of the vehicle may include at least one of a predefined vehicle type and a predefined vehicle color.

In some embodiments, the memory may have stored therein instructions that when executed by the processor cause the processor to receive a search query from a user, process the vehicle data to search for a vehicle of interest in the plurality of images corresponding to the search query, and display, using a graphical user interface operatively coupled to the processor, the vehicle of interest. In some embodiments, the memory may have stored therein instructions that when executed by the processor cause the processor to assign a rank to the vehicle of interest using at least in part the part-based mixture model.

In some embodiments, the memory may be configured to store the vehicle data. The system may include a vehicle detection module configured to automatically detect at least one of the plurality of vehicles in at least one of the plurality of images. The system may further include a vehicle feature extraction module configured to automatically detect the vehicle feature. The system may further include a search module configured to query the stored vehicle data and return, based on one more vehicle feature search parameters, one or more vehicles of interest.

According to an embodiment, a non-transitory computer readable medium has stored thereon instructions that when executed by a processor cause the processor to access the image data representing a plurality of images of a plurality of vehicles, read a data model representing a predefined vehicle attribute, process a portion of the image data to detect a vehicle feature of at least one of the vehicles represented in at least one of the images based on the predefined vehicle attribute, and process the portion of the image data to generate vehicle data representing the detected vehicle feature.

In some embodiments, the non-transitory computer readable medium may have stored thereon instructions that when executed by the processor cause the processor to access a part-based mixture model calculated from training data representing the predefined vehicle attribute, wherein the vehicle feature is detected in the portion of the image data using the part-based mixture model. In some embodiments, the non-transitory computer readable medium may have stored thereon instructions that when executed by the processor cause the processor to process the image data representing the detected vehicle feature to generate a characterization of the vehicle based at least in part on the part-based mixture model. In some embodiments, the non-transitory computer readable medium may have stored thereon instructions that when executed by the processor cause the processor to receive a search query from a user, process the vehicle data to search for a vehicle of interest in the images corresponding to the search query, and display, using a graphical user interface operatively coupled to the processor, the vehicle of interest.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
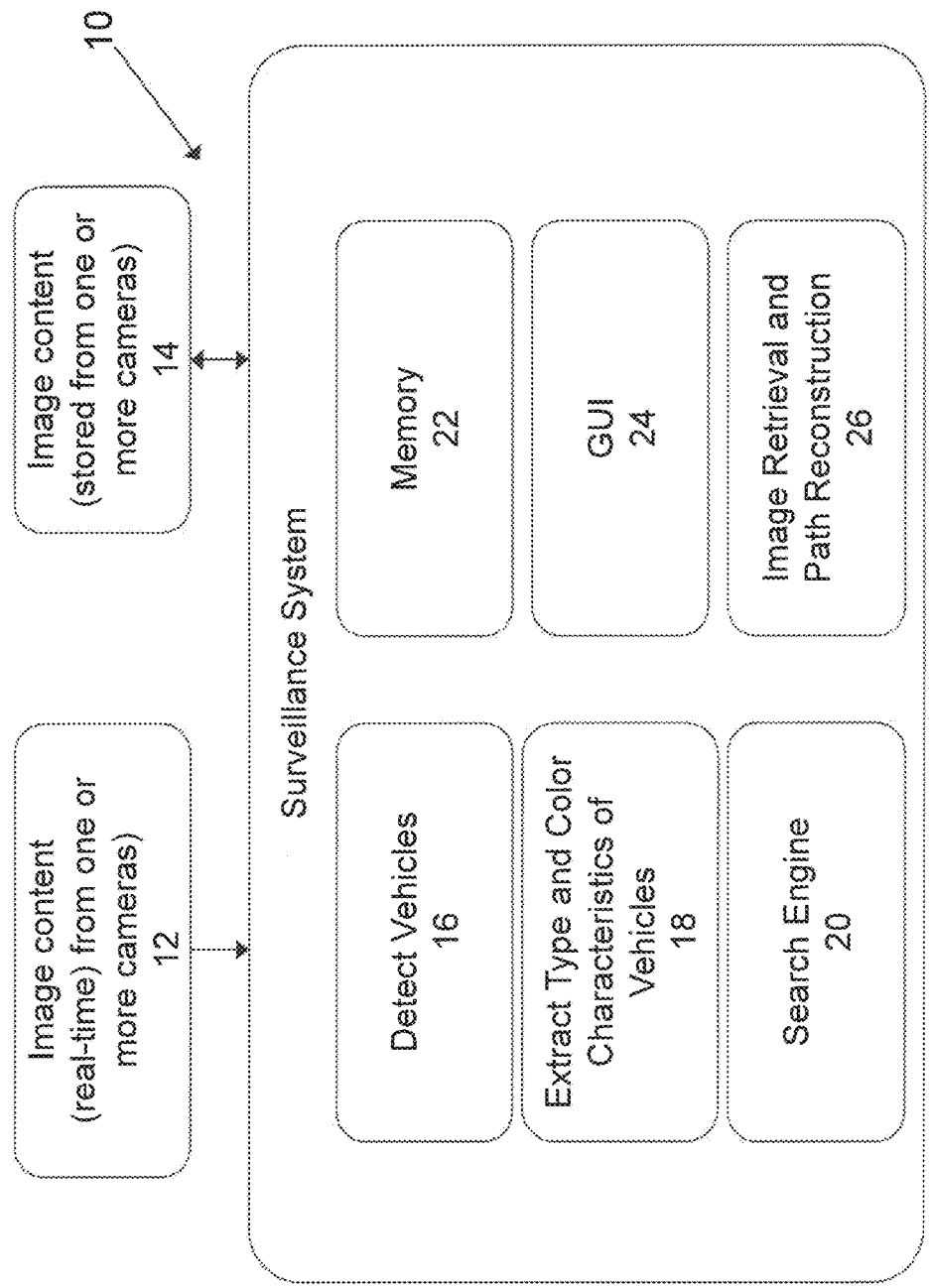
FIG. 1 depicts a block diagram of an example of a surveillance system, in accordance with an embodiment.

The present disclosure is directed to systems and methods of automatically detecting and categorizing vehicles in an image or series of images (e.g., a video). According to various embodiments, a vehicle of interest can be described according to various attributes, including, but not limited to, vehicle color, vehicle type, distinguishing characteristics, time and/or location, etc. For example, a vehicle of interest may be described as "a silver minivan with a white ribbon decal on the back". Some embodiment implement automatic attribute-based querying of image content for vehicles of interest using descriptors such as vehicle type and color. In some embodiments, the vehicle of interest can be automatically detected by analyzing the image or video for one or more of the various attributes. In some embodiments, the automatic detection can be supplemented by manually reviewing the vehicle of interest for further distinguishing characteristics, such as decals, bumper stickers, scratches, dents, scuff marks, and the like. Thus, the automatic attribute-based querying may be advantageously used to reduce the volume of surveillance data that is reviewed manually.

Automatic attribute-based detection, according to an embodiment, can be implemented using various components such as a vehicle detector component, a vehicle feature detector component including, for example, a type classifier and/or a vehicle color classifier, and a background suppression component.

The vehicle detector component can be used to analyze image content to detect one or more vehicles. Discriminative type-specific vehicle models can be learned from training data using a latent Support Vector Machine. Further, statistical color models of vehicles can be learned using a multivariate Gaussian distribution in a hue, saturation, and value (HSV) color space, or discrete approximations thereof. The vehicle detector component can be used to determine a likelihood that the image, or a region or portion of the image, includes a vehicle of a particular type and/or color. In some embodiments, the vehicle detector component can implement both coarse vehicle detection and fine vehicle detection. For example, coarse vehicle detection may be based on an analysis of an image as a whole, while fine vehicle detection may be based on an analysis of different regions or portions of an image. Thus, the vehicle detector component may be utilized to locate one or more vehicles in an image based on a likelihood that any of the regions includes a vehicle of interest or part of a vehicle of interest. In some embodiments, the vehicle detector component can be used to identify a directional path of a vehicle of interest that is in motion, for example, by analyzing successive images in a video sequence.

The vehicle feature detector component can be used to detect one or more vehicle features appearing in the image or video. For example, the vehicle feature component may include a vehicle type classifier for analyzing image content to determine a likelihood that the vehicle of interest in the image, or in a region of the image, is a particular type of vehicle, such as sedan, sport utility vehicle (SUV), station wagon, minivan, convertible, pickup truck, van, box truck, and the like. In another example, the vehicle feature component may include a vehicle color classifier for analyzing image content to determine the color of the vehicle of interest.

In some embodiments, systems and methods of the present disclosure can include suppression of background features in the image or video. Thus, for example, a background suppression component may be used to distinguish background regions in the image from foreground regions in the image. In some embodiments, background suppression can be used to facilitate identification of a vehicle, vehicle type, and/or vehicle color appearing in the foreground of the image. Background suppression can further be utilized to factor in background noise when determining an overall likelihood that an image or a region of an image includes a vehicle of interest. In some embodiments, the background suppression component can be implemented as part of the vehicle detection component, allowing the possibility of detecting both moving and stationary vehicles.

In some embodiments, the systems and methods of the present disclosure utilize search algorithms which combine the outputs of the vehicle detector, vehicle attribute detector and background suppression components to produce ranked search results representing an overall likelihood that an image or a region of an image includes a vehicle of interest. In some embodiments the search algorithms can implement these or other components in a sequential manner. Thus, the vehicle detector component may be used to filter image data, for example, by identifying one or more image regions in which a vehicle of interest likely appears. The identified image regions can then be subjected to further analysis via the vehicle attribute detector and/or background suppression components.

In some embodiments, the systems and methods can be used to process image content such as surveillance video in real time. For example, metadata may be extracted from the image content in which a vehicle of interest appears. The metadata may include information such as those provided by the vehicle detector, vehicle type classifier and vehicle color classifier. The information can be stored in a database. Thus, when a user enters a query, image content retrieval software searches the database for apparent matches and presents the results of the search to the user. In some embodiments, the retrieval can be performed in real-time, which advantageously enables users to run searches of the image or video based on, for example, vehicle descriptions, and browse the results for accessing the relevant surveillance data, as opposed to manually scanning very large amounts of video data that may not contain information relevant to the vehicle of interest.

FIG. 1 depicts an example block diagram of a surveillance system 10, in accordance with an embodiment. System 10 includes a vehicle detection module 16 for detection and localization of one or more vehicles, a vehicle feature extraction module 18 for detecting vehicle type and/or color, a search engine module 20, a memory 22, a graphical user interface (GUI) 24, and an image retrieval and path reconstruction module 26. The search engine module 20 can include a high-level attribute based search that analyzes attributes of each detected vehicle, such as vehicle type and color, to determine one or more vehicles of interest. The image retrieval and path reconstruction module 26 can retrieve images, video segments, and the like, including those associated with an identified vehicle of interest. The image retrieval and path reconstruction 26 model can, in some embodiments, reconstruct a path traveled by the vehicle of interest, or determine the direction of motion of the vehicle of interest, based on an analysis of successive images of the vehicle of interest from a single camera, or images of the vehicle of interest from multiple cameras, acquired over a period of time. In some embodiments, a network of cameras can be utilized to track a vehicle of interest from camera to camera. In some embodiments, the network of cameras can be associated with a mapping system, for example, for tracking a current location of a vehicle of interest, and/or predicting a likely path of the vehicle of interest.

System 10 can receive or have access to real time image data from one or more cameras 12 and/or from stored image data 14 acquired by one or more cameras, which are collectively referred to herein as input image data 15. The input image data 15 can exist in any number of formats, such as image formats known to those of skill in the art including, but not limited to, JPEG, TIFF, GIF, BMP, PNG, and SVG, or can be extracted from video in various compressed formats including, but not limited to, MPEG-2, MPEG-4, H.263, H.264, and FLV. Input image data 15 can be in analog or digital form. If input image data 15 is in analog format, system 10 can include analog to digital conversion components. Input image data 15 can be raw data or may have undergone some processing including decompression.

The vehicle detection module 16 can detect one or more vehicles the input image data 15. In some embodiments, the vehicle detection module 16 can utilize a combination of cues to determine a location of a vehicle in an image. For example, the vehicle detection module 16 may use Histograms of Oriented Gradients, size restrictions based on ground plane projections, and statistical models that discriminate background from foreground, and the like, to determine a location of a vehicle within an image. Histogram of Oriented Gradient descriptors are based on the theory that local object appearance and shapes within an image can be described by the distribution of intensity gradients and/or edge directions. The implementation of these descriptors can be achieved by dividing the image into small connected regions, and for each region compiling a histogram of gradient directions or edge orientations for the pixels within the cell. The combination of these histograms then represents the descriptor. For improved accuracy, the local histograms can be contrast-normalized by calculating a measure of the intensity across a larger region of the image, called a block, and then using this value to normalize all cells within the block. This normalization results in better invariance to changes in illumination or shadowing.

In some embodiments, the vehicle detection module 16 can analyze a plurality of regions of an image to determine a likelihood of each region including a vehicle (for example a part of a vehicle). In some embodiments, the vehicle detection module 16 can analyze a plurality of images having different scales to determine a likelihood that a vehicle (or part of a vehicle) is in any of the images. A vehicle location can then be determined based on spatially proximal regions of high likelihood. In some embodiments, location information for a vehicle is saved to memory 22. As used herein, the term vehicle image chip refers to image data for a region of an image associated with a location of a vehicle. In some embodiments, the memory 22 can be external to system 10. In some embodiments, the vehicle image chip itself can be stored in memory 22, instead of or in addition to location information. In some embodiments, a likelihood that an image, image region or vehicle image chip includes a vehicle can be calculated and stored in memory 22.

As noted above, the vehicle detection module 16 can advantageously be used to detect/locate vehicles or parts of vehicles in images. In some embodiments, the vehicle detection module can implement an algorithm that uses a part-based mixture model representation, where, for example, a part may be a rectangular section around a rear tire or the front bumper, a portion of a car door or windshield, a shape of a grille or body panel, a badge or nameplate, or other visually identifiable vehicle attribute. As will be understood by one of skill in the art, a mixture model is a probabilistic model for representing the presence of subpopulations of data within an overall population, without requiring that an observed dataset identifies the subpopulation to which any individual observation belongs. Thus, the vehicle detection module 16 can be trained to identify vehicles based on features such as Histograms of Oriented Gradients (HoG), which can be formulated at the part level as well as at the object level, or any combination thereof. The vehicle detection module 16 can be trained using example images of vehicles (e.g., images acquired from various sources, such as vehicle brochures, classified advertisements, promotional and marketing materials, professional photography, etc.) depicted in a variety of viewing and occlusion conditions. One advantage of using a part-based formulation and a mixture model framework includes the ability of the model to gracefully handle partial occlusion and pose variation, respectively.

In some embodiments, the vehicle detection module can be trained using latent Support Vector Machines (SVM). Latent variables can be used to model explanatory factors that cannot be observed or measured in experiments. Conventional examples include mixture models, factor analysis, K-means, and PCA. The introduction of latent variables to represent qualitative poses and object part locations implicitly eliminates the need to label training images beyond drawing bounding boxes around the vehicles. An initial estimate of the each of the mixture components can be produced by separately learned subdivisions of the training images by qualitative pose. The training algorithm may subsequently be, for example, an iterative procedure that alternates between fixing latent values for positive examples and optimizing the latent SVM objective function.

As noted above, the vehicle feature extraction module 18 can be used to extract information related to one or more discernible attributes of the image, such as vehicle type and/or color. In some embodiments, the vehicle feature extraction module 18 can be used to further characterize the vehicle of interest by analyzing vehicle image chips. In some embodiments, the vehicle feature extraction module 18 can include a vehicle type classifier for determining vehicle type, for example based on Histograms of Oriented Gradients (HoG). The vehicle type classifier can be based on a part-based mixture model representation and can be trained using latent SVMs. Thus, for example, given N vehicle types of interest, each of the corresponding N classification types may be trained using vehicle image chips of the target vehicle type as positive training samples, and vehicle image chips of the other N−1 classification types as negative training samples. In some embodiments, the bounding box location of the negative samples (as well as positive ones) can be treated as a latent variable, which is a distinct difference in how the vehicle detection module 16 is trained. In some embodiments, the training process can begin by substituting negative samples with random non-vehicle images to improve convergence. In some embodiments, vehicles can be divided into, for example, eight common types: sedan, coupe, convertible, hatchback, station wagon, van, SUV, and pickup truck. The choice to use these eight common types is largely based on classification schemes used by many car manufacturers, which also reflects how people commonly describe vehicles. Other classifications schemes, however, may be used.

In some embodiments, the vehicle feature extraction module 18 can include a vehicle color classifier for determining vehicle color. The vehicle color classifier can be based on perceptual colors, for example, a vehicle image chip. Thus, for example, hue, saturation, and value (HSV) may all be considered in evaluating a perceptual color of a vehicle. In some embodiments, the color classifier can be used to determine a closest match for the perceived color relative to a list of N typical vehicle colors. For example, a closest match may be determined based on relative distance in color space (for example, based on multivariate gaussian distribution in HSV space). In some embodiments, a background of an image can be analyzed and used to normalize a perceived color of a vehicle identified in the image.

Another implemented feature extraction method that can be included is the formation of "color projection pyramids." First, an adaptive statistical model can be used to estimate which pixels in a vehicle image chip belong to the vehicle (as opposed to the background). Then, a set of spatially-local color histograms can be computed using only those pixels. Each histogram can be formed by projecting a small neighborhood of pixels onto a basis of distributions defined in hue-saturation-value (HSV) color space. Finally, the projections can be aggregated over increasingly larger spatial areas, forming a pyramid of color projections at multiple spatial scales. In some embodiments, the color classifier can be trained using machine learning techniques such as SVMs or latent SVMs. Thus, for example, given M typical vehicle colors, each of the corresponding M classification colors may be trained using vehicle image chips of the target color as positive training samples, and vehicle image chips of the other M−1 colors as negative training samples. In some embodiments, a likelihood that an image, image region or vehicle image chip includes a characteristic or set of characteristics can be calculated and stored in memory 22. The choice for M may, for example, be based on common perceptual colors used on certain vehicles. By using appropriate vehicle databases, module 18 can be further optimized to rule out certain combinations of vehicle color and vehicle type that are not feasible.

In some embodiments, a set of tools, for example, implemented in MATLAB®, sold by MathWorks, Inc. of Natick, Mass., can be used to establish the ground truth for a subset of data for training purposes. In some embodiments, the tools can allow a user to mark bounding boxes around vehicles in images, specify their types, qualitative orientations, and primary colors, and select representative points on vehicles with the specified color for training purposes.

As noted above, the search engine module 20 can include a high-level attribute search, wherein a user specifies a high-level attribute profile for a vehicle of interest, and the system automatically searches through archived images for examples of vehicles which satisfy the specified criteria. Thus, the search engine module 20 can search the memory 22 and return one or more images, image regions, or vehicle image chips which best satisfy the specified criteria. In some embodiments, the search engine module 20 can calculate a likelihood that a result includes a vehicle of interest, for example, based on a likelihood that an image, image region or vehicle image chip includes a characteristic or set of characteristics. In some embodiments, a vehicle search can be initiated by providing one or more vehicle image chips of target vehicles (and possibly one or more vehicle image chips of vehicles which are not targets as negative examples). Thus the search engine module 20 can employ machine learning to extrapolate criteria for the target vehicles, which can then be used to search the stored image data.

In some embodiments, the search engine module 20 can refine the search results based on historical data generated from prior user interaction with the system. For example, if during prior searches the user selects search results containing a certain type of vehicle (e.g., a van) as being a vehicle of interest, the search engine module 20 may further refine the search results to include that certain type of vehicle. In some embodiments, the user can train the system using a set of training exemplars. For example, a first set of images containing vehicles having attributes that are similar to vehicles of interest (positive exemplars) and a second set of images that do not contain vehicles having those attributes (negative exemplars) can be identified based on user input (e.g., images containing vehicles of interest, as identified by the user, may be used as positive exemplars for training the search engine module 20 to identify vehicles having similar attributes in the stored image data; the remaining images may be used as negative exemplars for training the search engine module to identify images less likely to contain a vehicle of interest). In some embodiments, the training exemplars can be augmented with images from the same environment (e.g., video from traffic or law enforcement surveillance cameras).

The image retrieval and path reconstruction module 26 retrieves an image, image region or vehicle image chip corresponding to a vehicle of interest resulting from a query using the search engine module 20. Retrieved images, image regions or vehicle image chips can be displayed via a graphical user interface (GUI) 24. The image retrieval and path reconstruction module 26 can also reconstruct a path of a vehicle of interest that has spatial and temporal coherence. In some embodiments, the image retrieval and path reconstruction module 26 can enable review or export of composite images depicting the recorded activities of a vehicle of interest across multiple camera views. The GUI 24, which may be in communication with all the other modules, can also be used to initiate searches and analyze the results of the searches.

In some embodiments, the search results, or a portion of the search results, can be displayed using the GUI, e.g., in a thumb-nail image format. The results can be ranked and/or ordered by confidence; that is, a confidence that the image contains a vehicle of interest. The confidence can be determined using the part-based mixture model. In some embodiments, the GUI can be configured to allow the user to browse and/or filter the results based on one or more visual characteristics (e.g., the presence of a decorative decal affixed to the vehicle), and/or construct a new search query to refine the results (e.g., by specifying certain vehicle attributes, such as a hue or shade of a particular color). In some embodiments, the GUI can be configured to allow the user to adjust the relative importance of certain vehicle attributes. For example, the user may place a higher importance on vehicle type than color. Accordingly, the search results can be refined to include vehicles of interest having higher importance attributes than vehicles with other, lower importance attributes.

As noted above, in some embodiments, the system 10 may provide background suppression. More particularly, to reduce the number of vehicle false positives and/or inaccurate vehicle location determinations generated by static background patterns, a dynamic background model of the image scene can be created. Background suppression may, for example, be used to suppress stationary vehicles (e.g. parked vehicles) if desired from being detected. Background subtraction techniques can use adaptive statistical models of static background at the pixel level, then compare new frames of video to these models in order to estimate which pixels depict a dynamic foreground. Some embodiments can incorporate a background subtraction technique that maintains an adaptive Gaussian mixture model in three-dimensional color space for every pixel. For example, a foreground ratio may be measured for each candidate bounding box, computed as the ratio of all pixels within the box that are labeled as foreground by the model. The multimodal form of the resulting background model compensates for shadow effects in the image.

In some embodiments, the vehicle detector and/or the background suppression can produce a real-valued score indicating the degrees to which their respective criterion are met for a location $\vec{p}$: for example, the output of the latent SVM for vehicle detection $s_{lsvm}(\vec{p})$ and the foreground ratio $r_{fore}(\vec{p})$. The fused detections result from a function $f(s_{lsvm}(\vec{p}), r_{fore}(\vec{p}))$ mapping all both values to either one (detection) or zero (no detection). For computational efficiency, this function can be decomposed into a combination of individual thresholds applied to each value. By employing individual thresholds, a cascaded detection strategy can be used to improve computational efficiency. The computationally simpler foreground ratio can be evaluated first to rule out most candidate bounding box positions. As a result, the computationally more expensive HOG analysis need only be performed for limited images and image regions. Thresholds can be selected empirically from training data. In some embodiments, HOGs computed using the vehicle detection module 16 can be fed into the vehicle type SVM classifier, thereby further increasing processing efficiency.

In some embodiments an image chip (e.g., a portion of the frame identified by a window) is first analyzed to determine if it passes the threshold for containing a high ratio of foreground pixels. If not, there is no detection and the window is moved to a new location in the frame. If the image chip passes the detection threshold for foreground pixels, the image chip is analyzed to determine if it satisfies the ground plane constraints. If it does not, there is no detection and the window is moved to a new location in the frame. If the image chip does satisfy the ground plane constraints, the image chip is analyzed to determine if it contains a vehicle. If it does not, there is no detection and the window is moved to a new location in the image. If the image chip does contain a vehicle, a vehicle is detected and the image chip can be termed a vehicle image chip. Image information for locating the vehicle image chip can be stored in storage 22. In other embodiments, the vehicle image chip itself can be stored in storage 22.

Figure 2:
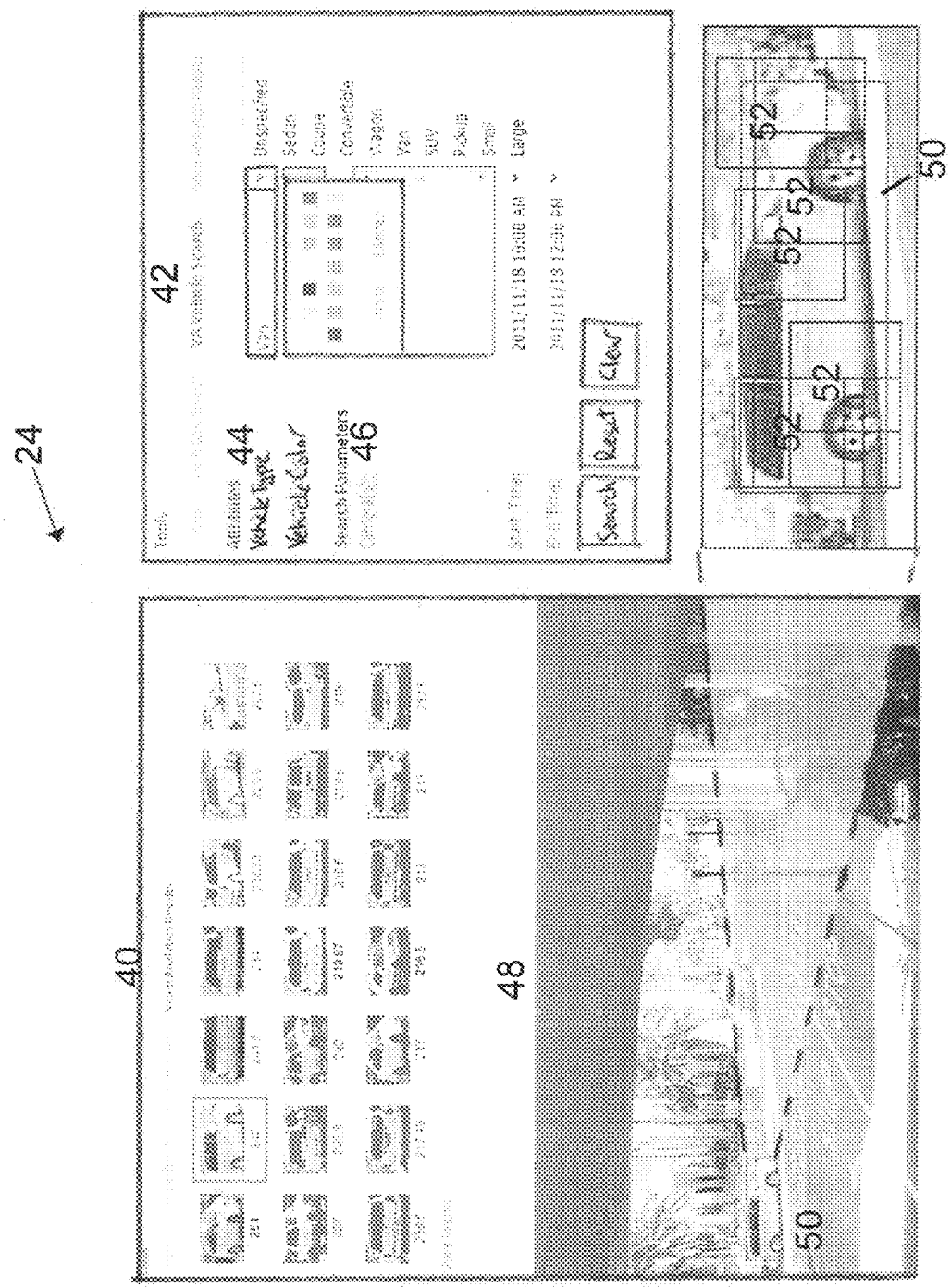
FIG. 2 depicts one example of a graphical user interface for use with the surveillance system of FIG. 1, in accordance with an embodiment.

FIG. 2 depicts an exemplary GUI 24 for the search system 10. The GUI 24 may include, for example, a result viewing and image/video playback panel 40. The panel 40 may depict, for example, thumbnails of a plurality of vehicle image chips returned by a query. The returned results may be sorted, ordered or ranked, for example, from most likely to be a vehicle of interest to least likely. For example, the results may be ranked by a weighted combination of the vehicle type classifier score and the vehicle color likelihood score. In some, embodiments, only results sufficiently matching a set of query attributes are returned. The GUI 24 can also include a vehicle search panel 42 for entering a query, for example, based on attributes 44, such as vehicle type and vehicle color, and search parameters 46, such as camera number, start time, stop time, and the like. The GUI 24 can display a full image corresponding to a selected search result in an image panel 48. The image panel 48 can, in some embodiments, provide a more detailed depiction of the vehicle image chip 50 and vehicle part locations 52.

Figure 3:
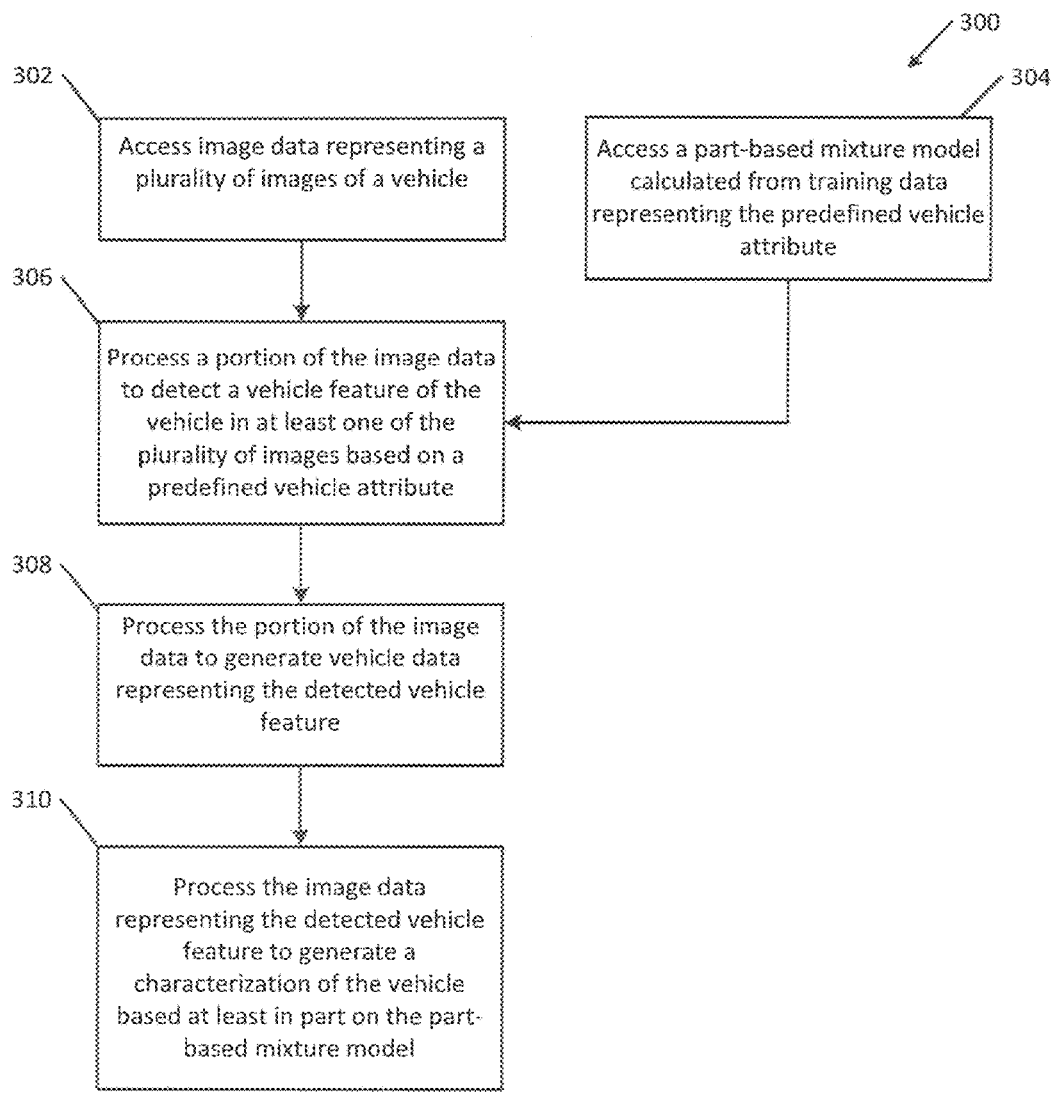
FIG. 3 is an example flow diagram of an image processing method 400, in accordance with an embodiment.

FIG. 3 is an example flow diagram of an image processing method 300 according to an embodiment. At step 302, a processor accesses image data representing a plurality of images of a vehicle. At step 304, the processor accesses a part-based mixture model calculated from training data representing the predefined vehicle attribute. The vehicle feature can be detected in the portion of the image data using the part-based mixture model. At step 306, the processor processes a portion of the image data to detect a vehicle feature of the vehicle in at least one of the plurality of images based on a predefined vehicle attribute. At step 308, the processor processes the portion of the image data to generate vehicle data representing the detected vehicle feature. The part-based mixture model can be trained using latent support vector machine. At step 310, the processor processes the image data representing the detected vehicle feature to generate a characterization of the vehicle based at least in part on the part-based mixture model. The characterization of the vehicle can include at least one of a predefined vehicle type and a predefined vehicle color.

Figure 4:
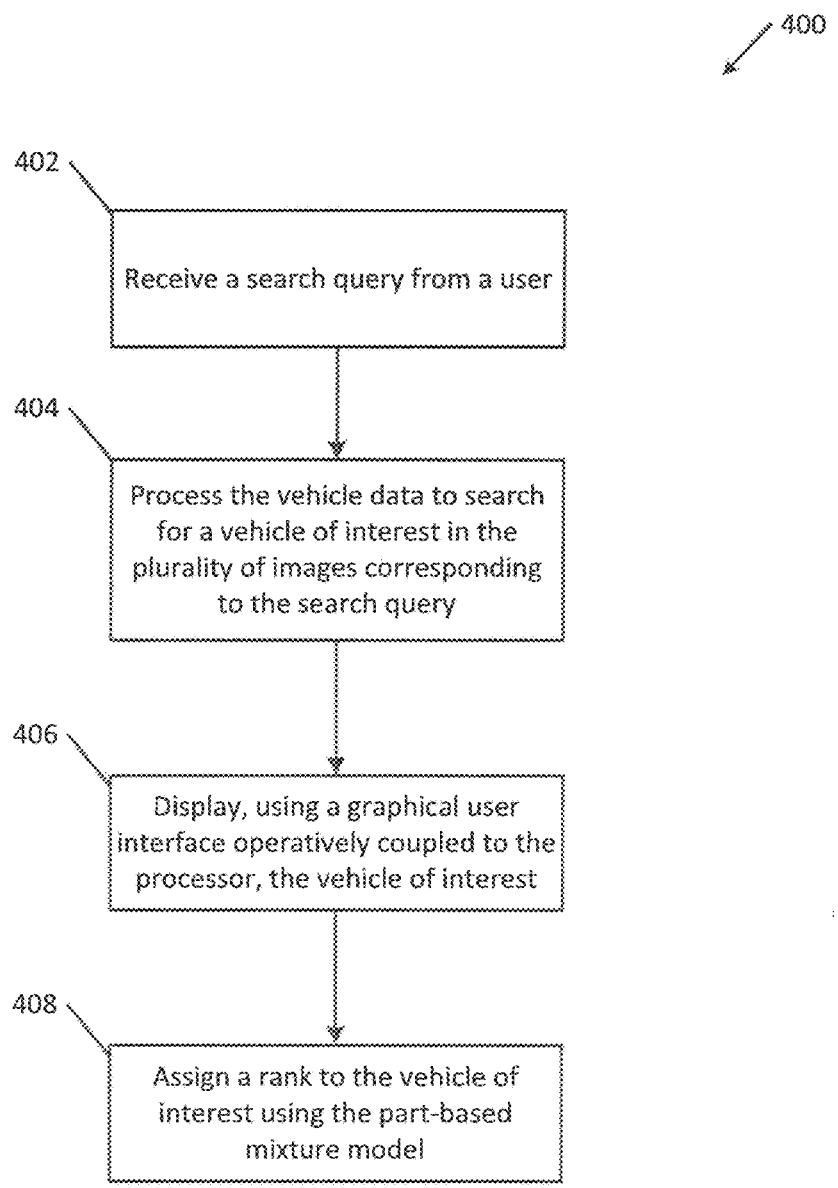
FIG. 4 is an example flow diagram of an image processing method 400, in accordance with an embodiment.

FIG. 4 is an example flow diagram of an image processing method 400 according to an embodiment. At step 402, a processor receives a search query from a user. At step 404, the processor processes the vehicle data to search for a vehicle of interest in the plurality of images corresponding to the search query. At step 406, the processor displays, using a graphical user interface operatively coupled to the processor, the vehicle of interest. At step 408, the processor assigns a rank to the vehicle of interest using the vehicle-type specific part-based mixture model.

Having thus described several exemplary embodiments of the disclosure, it is to be appreciated various alterations, modifications, and improvements will readily occur to those skilled in the art. For example, it is contemplated that the methods and systems disclosed herein may be used in conjunction with law enforcement applications, such as surveillance, security, analytics (e.g., traffic monitoring) and automatic license plate recognition (ALPR) systems, for reducing the man-power needed to search through large amounts of video when looking for a vehicle of interest. Accordingly, the foregoing description and drawings are by way of example only.

What is claimed is:

1. A computer-implemented image processing method, the computer including a processor and a memory operatively coupled to the processor, the method performed by the processor comprising:
   accessing image data representing a plurality of images of a plurality of vehicles;
   accessing a discriminative type-specific vehicle model calculated from training data representing a predefined vehicle attribute;
   processing, using the discriminative type-specific vehicle model, a portion of the image data to automatically detect a vehicle feature of a vehicle of interest from the plurality of vehicles represented in two or more images of the plurality of images based on the predefined vehicle attribute;
   processing the portion of the image data to automatically generate vehicle data representing the detected vehicle feature; and
   reconstructing a path traveled by the vehicle of interest using the vehicle data.

2. The computer-implemented method of claim 1, wherein the discriminative type-specific vehicle model is a part-based mixture model calculated from training data representing the predefined vehicle attribute and where the vehicle feature is detected in the portion of the image data using the part-based mixture model.

3. The computer-implemented method of claim 2, wherein the part-based mixture model is learned using a latent support vector machine.

4. The computer-implemented method of claim 1, further comprising processing the image data representing the detected vehicle feature to generate a characterization of the vehicle of interest based at least in part on the discriminative type-specific vehicle model.

5. The computer-implemented method of claim 4, wherein the characterization of the vehicle of interest includes at least one of a predefined vehicle type and a predefined vehicle color.

6. The computer-implemented method of claim 1, further comprising:
   receiving a search query from a user;
   processing the vehicle data to search for the vehicle of interest in the plurality of images corresponding to the search query; and
   displaying, using a graphical user interface operatively coupled to the processor, a composite view depicting recorded activities of the vehicle of interest across multiple camera views.

7. The computer-implemented method of claim 1, further comprising exporting a composite image depicting recorded activities of the vehicle of interest across multiple camera views.

8. An image processing system comprising:
   a processor; and
   a memory operatively coupled to the processor, the memory having stored therein instructions that when executed by the processor cause the processor to:
      access image data representing a plurality of images of a plurality of vehicles;
      access a discriminative type-specific vehicle model calculated from training data representing a predefined vehicle attribute;
      process, using the discriminative type-specific vehicle model, a portion of the image data to automatically detect a vehicle feature of a vehicle of interest from the plurality of vehicles represented in two or more images of the plurality of images based on the predefined vehicle attribute;
      process the portion of the image data to automatically generate vehicle data representing the detected vehicle feature; and
      reconstruct a path traveled by the vehicle of interest using the vehicle data.

9. The system of claim 8, wherein the memory has further stored therein instructions that when executed by the processor cause the processor to:
   receive a search query from a user;
   process the vehicle data to search for the vehicle of interest in the plurality of images corresponding to the search query; and
   display, using a graphical user interface operatively coupled to the processor, a composite view depicting recorded activities of the vehicle of interest across multiple camera views.

10. The system of claim 8, wherein the memory has further stored therein instructions that when executed by the processor cause the processor to export a composite image depicting recorded activities of the vehicle of interest across multiple camera views.

11. The system of claim 8, wherein the memory has further stored therein instructions that when executed by the processor cause the processor to process the image data representing the detected vehicle feature to generate a characterization of the vehicle of interest based at least in part on the discriminative type-specific vehicle model.

12. A computer-implemented image processing method, the computer including a processor and a memory operatively coupled to the processor, the method performed by the processor comprising:
   accessing image data representing a plurality of images of a plurality of vehicles;
   accessing a discriminative type-specific vehicle model calculated from training data representing a predefined vehicle attribute;

processing, using the discriminative type-specific vehicle model, a portion of the image data to automatically detect a vehicle feature of a vehicle of interest from the plurality of vehicles represented in two or more images of the plurality of images based on the predefined vehicle attribute;

processing the portion of the image data to automatically generate vehicle data representing the detected vehicle feature; and determining a direction of motion of the vehicle of interest using the vehicle data.

13. The computer-implemented method of claim 12, further comprising exporting a composite image depicting recorded activities of the vehicle of interest across multiple camera views.

14. The computer-implemented method of claim 12, wherein the discriminative type-specific vehicle model is a part-based mixture model calculated from training data representing the predefined vehicle attribute and where the vehicle feature is detected in the portion of the image data using the part-based mixture model.

15. The computer-implemented method of claim 14, wherein the part-based mixture model is learned using a latent support vector machine.

16. The computer-implemented method of claim 12, further comprising processing the image data representing the detected vehicle feature to generate a characterization of the vehicle of interest based at least in part on the discriminative type-specific vehicle model.

17. The computer-implemented method of claim 16, wherein the characterization of the vehicle includes at least one of a predefined vehicle type and a predefined vehicle color.

18. The computer-implemented method of claim 12, further comprising:

receiving a search query from a user;

processing the vehicle data to search for a vehicle of interest in the plurality of images corresponding to the search query; and displaying, using a graphical user interface operatively coupled to the processor, a composite view depicting recorded activities of the vehicle of interest across multiple camera views.

* * * * *